United States Patent
Li et al.

(10) Patent No.: US 10,447,396 B1
(45) Date of Patent: Oct. 15, 2019

(54) LOW-SPEED SIGNAL PHOTOELECTRIC CONVERSION MODULE OF UNIVERSAL MULTIMEDIA INTERFACE

(71) Applicant: EverPro Technologies Company Ltd., Wuhan (CN)

(72) Inventors: Yan Li, Beijing (CN); Rui Qin, Beijing (CN); Yufeng Cheng, Beijing (CN); Hui Jiang, Beijing (CN); Jinkuan Tang, Beijing (CN)

(73) Assignee: EverPro Technologies Company Ltd., Wuhan (CN)

( * ) Notice: Subject to any disclaimer, the term of this patent is extended or adjusted under 35 U.S.C. 154(b) by 0 days.

(21) Appl. No.: 16/184,029

(22) Filed: Nov. 8, 2018

(30) Foreign Application Priority Data

Jul. 25, 2018 (CN) .......................... 201810825687.0

(51) Int. Cl.
| | | |
|---|---|---|
| *H04B 10/25* | (2013.01) | |
| *H04L 5/14* | (2006.01) | |
| *H04B 10/40* | (2013.01) | |
| *H04B 10/66* | (2013.01) | |
| *H04B 10/60* | (2013.01) | |
| *H04B 10/50* | (2013.01) | |

(52) U.S. Cl.
CPC ......... *H04B 10/2503* (2013.01); *H04B 10/40* (2013.01); *H04L 5/14* (2013.01); *H04B 10/50* (2013.01); *H04B 10/60* (2013.01); *H04B 10/66* (2013.01)

(58) Field of Classification Search
None
See application file for complete search history.

(56) References Cited

U.S. PATENT DOCUMENTS

| | | | | |
|---|---|---|---|---|
| 2003/0108030 | A1* | 6/2003 | Gao | H04L 12/4633 370/351 |
| 2005/0220416 | A1* | 10/2005 | Baldwin | G02B 6/4204 385/52 |
| 2011/0044217 | A1* | 2/2011 | Wu | H04L 5/14 370/294 |
| 2012/0020413 | A1* | 1/2012 | Chen | H04N 19/597 375/240.26 |
| 2015/0200996 | A1* | 7/2015 | Ziarati | H04L 67/02 709/201 |

* cited by examiner

*Primary Examiner* — Darren E Wolf
(74) *Attorney, Agent, or Firm* — Maier & Maier, PLLC

(57) ABSTRACT

A photo-electric conversion module for low-speed signals of universal multimedia interface. A protocol analysis module configured to analyze directions of half duplex signals and perform conversion to full duplex signals; a packing and encoding module configured to pack received full duplex signal in a frame format and send the encapsulated signals to an electric-photo conversion module; the electric-photo conversion module configured to convert an electric signal to an optical signal and send the optical signal via an optical fiber; an unpacking and decoding module configured to perform frame unpacking and decoding on a received high-speed electric signal and send a full duplex signal obtained through protocol analysis to the protocol analysis module for protocol analysis again; and a photo-electric conversion module.

8 Claims, 2 Drawing Sheets

LOW-SPEED SIGNAL PHOTOELECTRIC CONVERSION MODULE OF UNIVERSAL MULTIMEDIA INTERFACE

FIELD

The present invention relates to multimedia interfaces, and in particular, to a low-speed signal photo-electric conversion module of universal multimedia interface, which can convert low-speed signals to be used by a plurality of multimedia transmission lines to high-speed signals suitable for optical fiber transmission, and can achieve sending and receiving of all multimedia interface control signals with only two differential pairs, thereby lowering the cost and reducing the power consumption.

BACKGROUND

With the increasingly high demand by people for better life, digital HD technologies have been experiencing a rapid development, and a variety of ultra HD audio/video devices have been continuously developed. Meanwhile, a variety of multimedia interfaces applicable for HD audio/video transmission, such as HDMI, DP, and the like, have been developed accordingly. There is an increasingly great information data amount for control signals transmitted by various multimedia interfaces. On the other hand, the conventional manner of copper wire transmission can achieve only a short distance transmission due to relatively high losses. At the same time, the manufacturing cost of high-grade cables increases sharply along with the increase of the cable length. Optical fiber transmission would be an excellent alternative.

A multimedia interface may simultaneously transmit a plurality of control signals, or at the same moment, a plurality of multimedia interfaces may simultaneously transmit their respective control signals. In optical fiber transmission lines, each transmission line requires its own laser driver and laser receiver. A lot of transmission lines would require a lot of laser drivers and laser receivers, as well as optical fibers. When the cost and the power consumption are increased, the product yield is also impacted significantly.

Optical signals can be used for an excellent transmission of high-speed signals, but for transmission of low-speed signals or when there is no signal input, the receiving end outputs noise, and an amplifier of a photo-electric chip can readily amplify the noise to an amplitude of a normal signal, which leads to errors.

Therefore, how to reduce transmission lines required by transmitting control signals of a plurality of multimedia interfaces, to transmit control signals in real time, and a high-speed transmission applicable for optical signals is a technical problem of the prior art in urgent need to be solved.

SUMMARY

The object of the present invention is to provide a low-speed signal photo-electric conversion module of universal multimedia interface, which can convert all transmitted low-speed signals to high-speed signals suitable for optical fiber transmission through analysis, packing and encoding, and can achieve sending and receiving of all multimedia interface control signals with only two differential pairs, thereby lowering the cost and reducing the power consumption.

To achieve the object, the present invention employs the following technical solution:

A low-speed signal photo-electric conversion module of universal multimedia interface, comprising:

a protocol analysis module configured to analyze half duplex signals in various multimedia control protocols according to protocol specifications of multimedia control signals, determine a signal direction related to the protocol, convert a low-speed signal of a multimedia interface to a full duplex signal, and send the full duplex signal to a packing and encoding module, or perform protocol analysis again on a full duplex signal outputted by an unpacking and decoding and obtained through protocol analysis to recover the half duplex signal, and then send the half duplex signal to the multimedia interface;

the packing and encoding module configured to pack a full duplex signal of the multimedia interface and a full duplex signal converted from a half duplex signal through protocol analysis, encapsulate all multimedia interface low-speed control signals of the same moment in a frame format, and send the encapsulated signals to an electric-photo conversion module;

the electric-photo conversion module configured to convert an electric signal to an optical signal and send the optical signal via an optical fiber;

the unpacking and decoding module configured to perform frame unpacking and decoding on a received high-speed electric signal, convert the signal to a low-speed signal, directly send a full duplex signal in the low-speed control signal to the multimedia interface, send a full duplex signal obtained through protocol analysis to the protocol analysis module for protocol analysis again to recover the half duplex signal, and send the half duplex signal to the multimedia interface after the signal direction is determined; and a photo-electric conversion module configured to receive an optical signal sent via an optical fiber, convert the optical signal to an electric signal, and send the electric signal to the unpacking and decoding module.

Optionally, the multimedia control signal comprises one or more of HDMI, DP, and user-defined protocols.

Optionally, the protocol analysis module being configured to analyze half duplex signals in various multimedia control protocols according to protocol specifications of multimedia control signals, and determine a signal direction related to the protocol comprises:

for an I$^2$C signal in the HDMI protocol, performing, by the protocol analysis module, analysis data by data and bit by bit according to the historical state and current state of the I$^2$C signal to determine directions of SCL and SDA in the relevant half duplex signal I$^2$C;

for a CEC signal in the HDMI protocol, performing, by the protocol analysis module, analysis data by data and bit by bit according to the historical state and current state of the CEC signal to determine the direction of the CEC signal, the processing manner thereof being similar to that for I$^2$C; and for an AUX signal in the DP protocol, performing, by the protocol analysis module, analysis according to the current state of the AUX signal to determine the direction of the AUX signal.

Optionally, the frame comprises a frame identifier and frame content, the frame content having different bits at different locations to store control signals of a plurality of protocols.

Optionally, a null bit "0" can be inserted into the frame content to maintain distinctiveness and uniqueness of the frame identifier.

Optionally, the packing and encoding module performs line coding on the packed data to convert the same to high-speed signals suitable for optical signal transmission, and sends the high-speed signals to the electric-photo conversion module.

Optionally, the packing and encoding module introduces 0/1 jump in line coding, such that "0" becomes "01" and "1" becomes "10".

Optionally, the packing and encoding module can transmit null signals.

Therefore, the present invention has the following advantages:

1. By simultaneously packing and encapsulating a protocol-related full duplex signal and a full duplex signal converted from a half duplex signal, control signals can be transmitted at any time, and even null signals can be transmitted, which improves the real time performance of control signal transmission;

2. Control signals are transmitted in a frame format, and therefore, different locations of a frame have different bits to store control signals of a plurality of protocols or a plurality of interfaces, which can simultaneously transmit a plurality of control signals in a plurality of multimedia interfaces received at the same moment, thereby saving the cost, and the use of just two pairs of differential signals, one for receiving and the other for sending, can achieve bidirectional transmission of signals of HDMI, DP, and user-defined protocols.

The legends in the figures respectively represent the following technical features:

1. protocol analysis module; 2. packing and encoding module; 3. electric-photo conversion module; 4. unpacking and decoding module; 5. photo-electric conversion module.

DETAILED DESCRIPTION

The present invention will be further described in detail below with reference to the accompanying drawings and embodiments. It should be understood that the specific embodiments described herein are only used to describe, rather than limit, the present invention. Moreover, it should be further noted that, for easiness of description, the accompanying drawings only illustrate a part of the structure related to the present invention, instead of the whole structure thereof.

According to the present invention, low-speed signals of a plurality of multimedia interfaces are sent to the low-speed signal photo-electric conversion module of universal multimedia interface, full duplex signals in the low-speed signals are directly packed and encoded, half duplex signals in the low-speed signals are subject to protocol analysis and packed and encoded after signal directions are determined, and all packed and encoded control signals of the same moment are transmitted, for example, after being encapsulated in a frame format, thereby achieving simultaneous optical transmission of low-speed control signals of a plurality of multimedia interface protocols. On the other hand, the decoding mode of signals after the optical transmission is similar to the encoding mode, i.e., full duplex signals are directly analyzed, and half duplex signals are subjected to protocol analysis and then transmitted after signal directions are determined.

Figure 1:
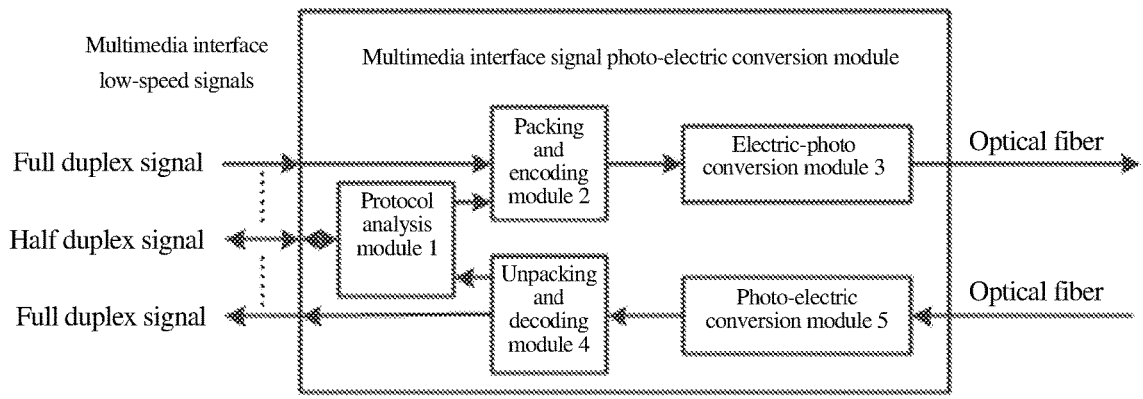
FIG. 1 is a block diagram of the low-speed signal photo-electric conversion module of universal multimedia interface according to a specific embodiment of the present invention.

Specifically, referring to FIG. 1, a block diagram of the low-speed signal photo-electric conversion module of universal multimedia interface according to a specific embodiment of the present invention is illustrated, comprising:

a protocol analysis module 1 configured to analyze half duplex signals in various multimedia control protocols according to protocol specifications of multimedia control signals, determine a signal direction related to the protocol, convert a low-speed signal of a multimedia interface to a full duplex signal, and send the full duplex signal to a packing and encoding module, or perform protocol analysis again on a full duplex signal outputted by an unpacking and decoding module and obtained through protocol analysis to recover the half duplex signal, and then send the half duplex signal to the multimedia interface;

the packing and encoding module 2 configured to pack a full duplex signal of the multimedia interface and a full duplex signal converted from a half duplex signal through protocol analysis, encapsulate all multimedia interface low-speed control signals of the same moment in a frame format, and send the encapsulated signals to an electric-photo conversion module;

the electric-photo conversion module 3 configured to convert an electric signal to an optical signal and send the optical signal via an optical fiber;

the unpacking and decoding module 4 configured to perform frame unpacking and decoding on a received high-speed electric signal, convert the signal to a low-speed signal, directly send a full duplex signal in the low-speed control signal to the multimedia interface, send a full duplex signal obtained through protocol analysis to the protocol analysis module for protocol analysis again to recover the half duplex signal, and send the half duplex signal to the multimedia interface after the signal direction is determined; and a photo-electric conversion module 5 configured to receive an optical signal sent via an optical fiber, convert the optical signal to an electric signal, and send the electric signal to the unpacking and decoding module.

By performing protocol analysis on a protocol-related half duplex signal, determining the signal direction, and further converting the signal to a full duplex signal, therefore, the present invention facilitates the optical transmission of protocol signals Meanwhile, by packing and encapsulating a protocol-related full duplex signal and a full duplex signal converted from a half duplex signal in a frame format, the present invention can simultaneously transmit a plurality of control signals in a plurality of multimedia interfaces received at the same moment. On one hand, the real time transmission of control signals can be achieved, and on the other hand, different locations of a frame have different bits to store control signals of a plurality of protocols or a plurality of interfaces thanks to the use of the frame format.

The present invention will be further described below with the transmission of a plurality of control signals as an example:

A plurality of multimedia control signals comprises one or more multimedia interface low-speed control signals in HDMI, DP (Display Port) and user-defined protocols. The low-speed control signals comprise full duplex signals and half duplex signals. For example, in HDMI protocol, I²C and CEC signals are half duplex signals, and HPD signals are full duplex signals; AUX signals in DP signals are also half duplex signals Full duplex signals in the above low-speed control signals are directly sent to the packing and encoding module, and half duplex signals in the above low-speed control signals are sent to the protocol analysis module.

The protocol analysis module determines the direction of the half duplex signal at the current moment according to protocol specifications of the above multimedia control signals. If the direction is the input direction, the signal is converted to a full duplex signal and sent to the packing and encoding module.

Specifically, the protocol analysis module has different processing modes for determining signal direction with respect to different protocols, such as HDMI, DP, and user-defined protocols.

Figure 2:
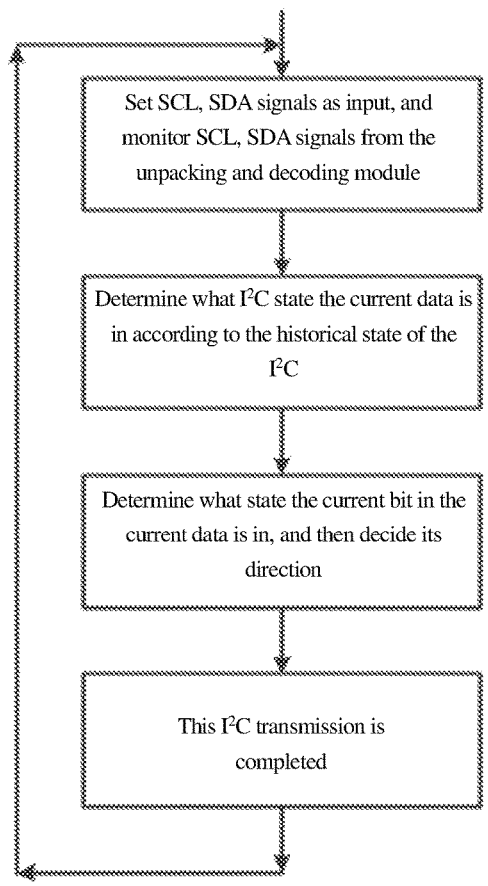
FIG. 2 is a flow chart of a particular protocol analysis to determine a direction of an I²C signal according to a specific embodiment of the present invention.

For example, with regard to an I²C signal in HDMI protocol, the input/output state of each data is related to previous data, and each bit inside each data has a different input/output state. Therefore, the protocol analysis module performs analysis data by data and bit by bit according to the historical state and current state of the I²C signal to determine the directions of the half duplex signal SCL and SDA in I²C. See FIG. 2 for a specific flow of protocol analysis.

For CEC in HDMI protocol, the protocol analysis module performs analysis data by data and bit by bit according to the historical state and current state of the CEC signal to determine the direction of CEC, the processing manner thereof being similar to that for I²C.

Figure 3:
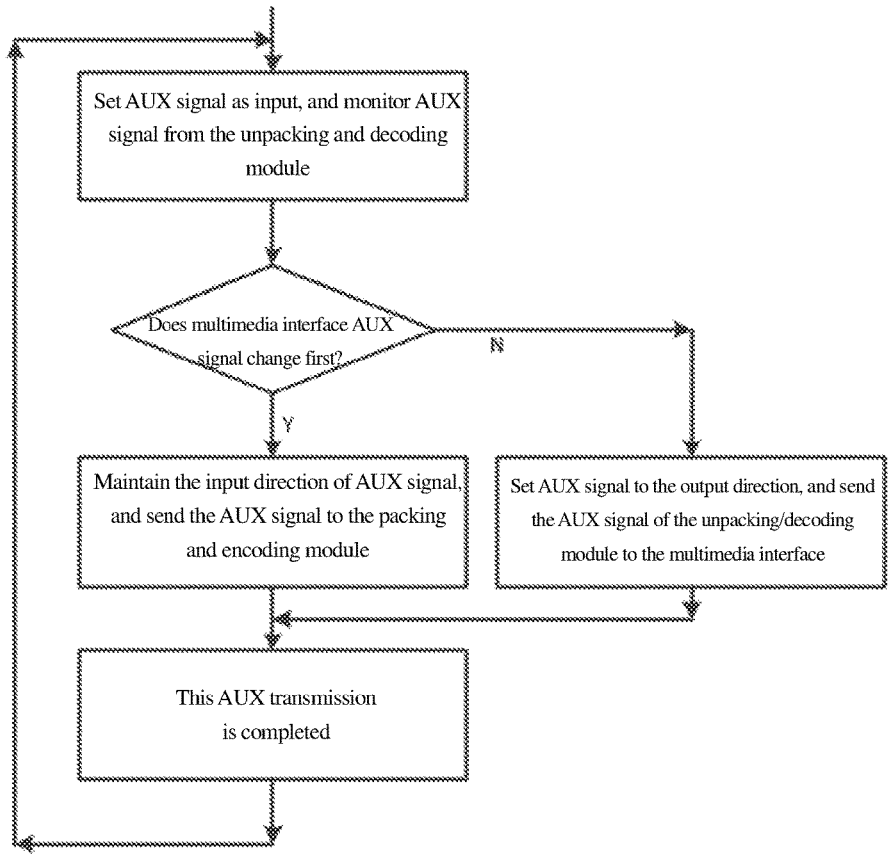
FIG. 3 is a flow chart of a particular protocol analysis to determine a direction of an AUX signal according to a specific embodiment of the present invention.

In another example, for AUX in DP protocol, source and sink on two ends of a communication medium exchange information in a Q&A format. Therefore, the input/output state of each data can be analyzed just based on the current state, and the direction of the AUX signal can then be determined. See FIG. 3 for a specific flow of protocol analysis.

With reference to the above two manners, HDMI and DP can be referred to for the analysis of a user-defined protocol. However, the present invention is not limited thereby. The manner of protocol analysis is not limited only to the above two manners, and any manner is feasible as long as the direction of a half duplex signal can be determined through analysis.

The packing and encoding module packs a full duplex signal that is directly inputted and a full duplex signal converted from a half duplex signal through protocol analysis, encapsulates all multimedia interface low-speed control signals of the same moment in a frame format, and achieves simultaneous transmission of low-speed control signals of a plurality of multimedia interfaces. As shown in Table 1, a potential packing and encoding format.

TABLE 1

| Frame identifier | HDMI | | | | DP | | User-defined protocol | | | | |
|---|---|---|---|---|---|---|---|---|---|---|---|
| | SCL | SDA | CEC | HPD | AUX | HPD | dum | UD1 | UD2 | ... | UDn |
| 01111110 | 0 | 1 | 1 | 1 | 1 | 1 | 0 | 1 | 0 | ... | 0 |

Here, frame identifiers are used to differentiate different frames, i.e., multimedia interface low-speed control signals at different moments, and frame identifiers are typically of a special format different from frame content, which is a special binary sequence of 01111110 in the present embodiment. A frame identifier is followed by frame content, i.e., multimedia interface low-speed control signals to be transmitted at the current moment, including SCL, SDA, CEC, and HPD of HDMI, AUX and HPD of DP, and low-speed control signals of a user-defined protocol.

Therefore, a plurality of control signals in a plurality of multimedia interfaces received at the same moment can be simultaneously transmitted in a frame format. On one hand, the real time transmission of control signals can be achieved, and on the other hand, different locations of a frame have different bits to store control signals of a plurality of protocols or a plurality of interfaces thanks to the use of the frame format.

For example, a plurality of control protocols are simultaneously transmitted in the example, and it is prescribed in the protocols that low-speed control signals of HDMI, DP, and a user-defined protocol are transmitted, respectively, after the frame identifier. Therefore, the above three types of low-speed control signals can be directly acquired from the frame content and sent to corresponding multimedia interfaces. Therefore, it can be seen from above that the present invention can achieve simultaneous transmission of a plurality of control protocols with a pair of differential pairs, which not only lowers the cost and reduces the power consumption, but also requires no wait. Compared with the use of an agent module to collect control signals to a certain length before transmission, the present invention further improves the real time performance of control signal transmission.

Furthermore, to maintain the special sequence of the frame identifier, the present invention can insert a null bit "0" into the frame content. For example, in Table 1, the frame identifier is 01111110, SCL, SDA, CEC, and HPD of HDMI, AUX and HPD of DP, and data UD1 and UD2 of a user-defined protocol form a special binary sequence of 01111110 that is the same as the frame identifier, which cannot be differentiated from the frame identifier. At this moment, a null bit 0 with no meaning can be inserted in front of UD1 in the user-defined protocol to change 01111110 in the frame content to 011111010, thereby maintaining distinctiveness and uniqueness of the frame identifier. The data stream packed and encapsulated by the packing and encoding module is shown in Table 2.

TABLE 2

| Frame 1 | | | | Frame 2 | | | | ... | Frame n | | | |
|---|---|---|---|---|---|---|---|---|---|---|---|---|
| Frame-identifier 1 | HDMI1 | DP1 | User-defined protocol 1 | Frame-identifier 2 | HDMI2 | DP2 | User-defined protocol 1 | ... | Frame-identifier n | HDMIn | DPn | User-defined protocol n |

The packing and encoding module performs line coding on the packed data to convert the same to high-speed signals suitable for optical signal transmission, and sends the high-speed signals to the electric-photo conversion module. Since serialization has been performed on a plurality of multimedia interface low-speed control signals of the same moment in the packing and encapsulating process and a frame identifier has been added, the signal rate has already been improved relative to the original low-speed signals. To further improve the signal transmission rate, however, the present invention can introduce 0/1 jump in frame, such that "0" becomes "01" and "1" becomes "10". There is no continuous "1" or continuous "0" in the packed and encapsulated data, which improves the signal rate again, such that the encoded signal can be suitable for optical transmission. If the signal rate after one 0/1 jump is introduced in one symbol still cannot meet requirements by optical communications, more jumps can be introduced to further improve the signal rate.

signal. If the direction is the output direction, the output signal of the unpacking and decoding module is sent to the multimedia interface.

Embodiment I

Figure 4:
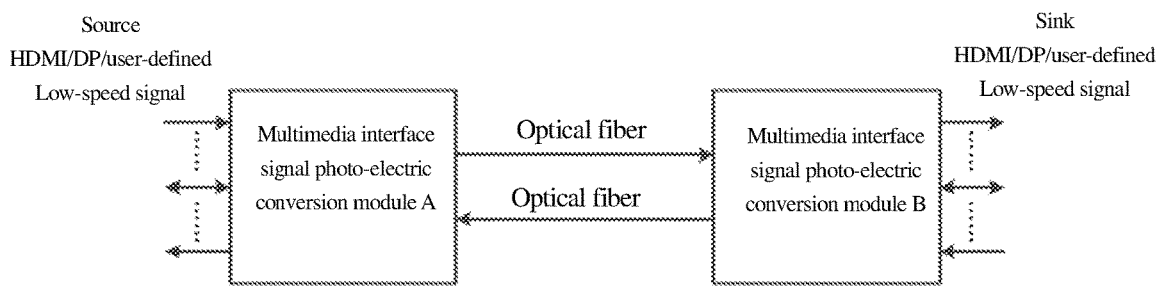
FIG. 4 is a schematic diagram of signal transmission between an exemplary of networking for interaction between the low-speed signal photo-electric conversion modules of universal multimedia interface according to a specific embodiment of the present invention.

In the present embodiment, the use of the low-speed signal photo-electric conversion module of universal multimedia interface according to the present invention to simultaneously transmit a plurality of multimedia interface signals via optical communications is further described with reference to FIG. 4.

In the figure, there are two low-speed signal photo-electric conversion modules A and B of universal multimedia interface, and low-speed control signals of HDMI, DP, and user-defined protocols are transmitted between source and sink.

Each multimedia interface low-speed signal photo-electric conversion module comprises a protocol analysis mod-

TABLE 3

| Frame identifier | HDMI | | | | DP | | User-defined protocol | | | | |
|---|---|---|---|---|---|---|---|---|---|---|---|
| | SCL | SDA | CEC | HPD | AUX | HPD | dum | UD1 | UD2 | ... | UDn |
| 0 1 1 1 1 1 1 0 | 0 | 1 | 1 | 1 | 1 | 1 | 0 | 1 | 0 | ... | 0 |
| 0 1 1 0 1 0 1 0 1 0 1 0 1 0 0 1 | 0 1 | 1 0 | 1 0 | 1 0 | 1 0 | 1 0 | 0 1 | 1 0 | 0 1 | ... ... | 0 1 |

The present invention is not limited by the above manner to improve the signal rate. Any manner is feasible as long as it can improve the signal rate.

The electric-photo conversion module converts a high-speed electric signal to an optical signal and sends the signal to the other end of multimedia interface via an optical fiber;

the photo-electric conversion module converts the optical signal received from the other end of multimedia interface via an optical fiber to a high-speed electric signal.

the unpacking and decoding module performs line decoding on the high-speed electric signal and converts the signal to a low-speed signal; the unpacking and decoding module unpacks the low-speed signal to obtain low-speed control signals of a plurality of multimedia interface protocols.

For a plurality of multimedia interface low-speed control signals of HDMI, DP, and user-defined protocols, the unpacking and decoding module directly sends a full duplex signal to the multimedia interface, and sends a full duplex signal obtained from a half duplex signal through protocol analysis to the protocol analysis module;

the protocol analysis module determines the direction of the signal at the current moment according to protocol specifications of HDMI, DP, and user-defined protocols, and converts the received full duplex signal to a half duplex ule, a packing and encoding module, an unpacking and decoding module, an electric-photo conversion module, and a photo-electric conversion module.

The source device sends the plurality of low-speed control signals of multimedia interface HDMI, DP, and user-defined protocols to be transmitted to the sink device to the multimedia interface low-speed signal photo-electric conversion module A, wherein $I^2C$ and CEC of HDMI and AUX of DP are half duplex signals and are converted by the protocol analysis module to full duplex signals and sent to the packing and encoding module; according to specific applications, if a user-defined control signal is a half duplex signal, it is sent to the protocol analysis module for processing, or if the user-defined control signal is a full duplex signal, it is directly sent to the packing and encoding module.

The packing and encoding module in the multimedia interface signal photo-electric conversion module A packs and encodes all low-speed control signals sent by the source device to the sink device, and then sends them to the electric-photo conversion module.

The electric-photo conversion module in the multimedia interface signal photo-electric conversion module A converts high-speed electric signals suitable for optical communications to optical signals and sends the optical signals to a photo-electric conversion module in the multimedia interface signal photo-electric conversion module B via an optical fiber.

The photo-electric conversion module in the multimedia interface signal photo-electric conversion module B converts the received optical signals to encoded high-speed electric signals and sends the high-speed electric signals to the unpacking and decoding module.

The unpacking and decoding module in the multimedia interface signal photo-electric conversion module B decodes the high-speed electric signals to low-speed signals, unpacks the low-speed signals to corresponding $I^2C$ and CEC of HDMI, AUX of DP, and user-defined control signals, sends full duplex signals from conversion by the protocol analysis module of the multimedia interface signal photo-electric conversion module A in the $I^2C$, CEC, AUX, and user-defined control signals to the protocol analysis module of the multimedia interface signal photo-electric conversion module B, and directly sends full duplex signals in the user-defined control signals to the sink device via the multimedia interface.

By analyzing the $I^2C$, CEC, AUX, and user-defined control signals, the protocol analysis module of the multimedia interface signal photo-electric conversion module B determines signal directions, converts them to half duplex signals, and sends the half duplex signals to the sink device via the multimedia interface.

After processing the information from the source device, the sink device sends a plurality of low-speed control signals of multimedia interfaces HDMI, DP, and user-defined protocols to be returned to source device to the multimedia interface low-speed signal photo-electric conversion module B, wherein $I^2C$ and CEC of HDMI and AUX of DP are half duplex signals and are converted by the protocol analysis module to full duplex signals and sent to the packing and encoding module; HPD of HDMI and HPD of DP are full duplex signals and directly sent to the packing and encoding module. According to specific applications, if a user-defined control signal is a half duplex signal, it is sent to the protocol analysis module for processing, or if the user-defined control signal is a full duplex signal, it is directly sent to the packing and encoding module.

The packing and encoding module in the multimedia interface signal photo-electric conversion module B packs and encodes all low-speed control signals sent by the sink device to the source device, and then sends the signals to the electric-photo conversion module.

The electric-photo conversion module in the multimedia interface signal photo-electric conversion module B converts high-speed electric signals suitable for optical communications to optical signals and sends the optical signals to the photo-electric conversion module in the multimedia interface signal photo-electric conversion module A via an optical fiber.

The photo-electric conversion module in the multimedia interface signal photo-electric conversion module A converts the received optical signals to encoded high-speed electric signals and sends the high-speed electric signals to the unpacking and decoding module.

The unpacking and decoding module in the multimedia interface signal photo-electric conversion module A decodes the high-speed electric signals to low-speed signals, unpacks the low-speed signals to corresponding $I^2C$, CEC, and HPD of HDMI, AUX and HPD of DP, and user-defined control signals, sends full duplex signals from conversion by the protocol analysis module of the multimedia interface signal photo-electric conversion module B in the $I^2C$, CEC, AUX, and user-defined control signals to the protocol analysis module of the multimedia interface signal photo-electric conversion module A, and directly sends full duplex signals in the HPD of HDMI, HPD of DP, and user-defined control signals to the source device via the multimedia interface.

By analyzing the $I^2C$, CEC, AUX, and user-defined control signals, the protocol analysis module of the multimedia interface signal photo-electric conversion module A determines signal directions, converts them to half duplex signals, and sends the half duplex signals to the source device via the multimedia interface.

Therefore, the present invention has the following advantages:

1. By simultaneously packing and encapsulating a protocol-related full duplex signal and a full duplex signal converted from a half duplex signal, control signals can be transmitted at any time, and even null signals can be transmitted, which improves the real time performance of control signal transmission;

2. Control signals are transmitted in a frame format, and therefore, different locations of a frame have different bits to store control signals of a plurality of protocols or a plurality of interfaces, which can simultaneously transmit a plurality of control signals in a plurality of multimedia interfaces received at the same moment, thereby saving the cost, and the use of just two pairs of differential signals, one for receiving and the other for sending, can achieve bidirectional transmission of signals of HDMI, DP, and user-defined protocols.

Obviously, a person skilled in the art should understand that all the above units or steps of the present invention can be implemented by a general computing device. The units or steps can be concentrated on one single computing device. Alternatively, the units or steps can be implemented by program codes executable by a computer device. Therefore, the units or steps can be stored in a storage device for execution by a computing device. Alternatively, the units or steps can be made into respective integrated circuit modules, or a plurality of modules or steps thereof can be made into a single integrated circuit module for implementation. As such, the present invention is not limited to any particular combination of hardware and software.

The content above further describes the present invention in detail with reference to specific preferred implementation manners, and the specific implementation manners of the present invention are not limited thereby. A number of simple deductions or substitutions may be made by a person skilled in the art without departing from the concept of the present invention, all of which shall fall within the scope of the present invention defined by the claims

The invention claimed is:

1. A low-speed signal photo-electric conversion module of universal multimedia interface, comprising:
   a protocol analysis module configured to analyze half duplex signals in various multimedia control protocols according to protocol specifications of multimedia control signals, determine a signal direction related to the protocol, convert a low-speed signal of a multimedia interface to a full duplex signal, and send the full duplex signal to a packing and encoding module, or perform protocol analysis again on a full duplex signal outputted by an unpacking and decoding module and obtained through protocol analysis to recover the half duplex signal, and then send the half duplex signal to the multimedia interface;

the packing and encoding module configured to pack a full duplex signal of the multimedia interface and a full duplex signal converted from a half duplex signal through protocol analysis, encapsulate all multimedia interface low-speed control signals of the same moment in a frame format, and send the encapsulated signals to an electric-photo conversion module;

the electric-photo conversion module configured to convert an electric signal to an optical signal and send the optical signal via an optical fiber;

the unpacking and decoding module configured to perform frame unpacking and decoding on a received high-speed electric signal, convert the signal to a low-speed signal, directly send a full duplex signal in the low-speed control signal to the multimedia interface, send a full duplex signal obtained through protocol analysis to the protocol analysis module for protocol analysis again to recover the half duplex signal, and send the half duplex signal to the multimedia interface after the signal direction is determined; and a photo-electric conversion module configured to receive an optical signal sent via an optical fiber, convert the optical signal to an electric signal, and send the electric signal to the unpacking and decoding module.

2. The photo-electric conversion module according to claim 1, wherein the multimedia control signal comprises one or more of HDMI, DP, and user-defined protocols.

3. The photo-electric conversion module according to claim 1, wherein the protocol analysis module being configured to analyze half duplex signals in various multimedia control protocols according to protocol specifications of multimedia control signals, and determine a signal direction related to the protocol comprises:

for an I$^2$C signal in HDMI, performing, by the protocol analysis module, analysis data by data and bit by bit according to the historical state and current state of the I$^2$C signal to determine directions of the relevant half duplex signal SCL and SDA in I$^2$C;

for a CEC signal in HDMI, performing, by the protocol analysis module, analysis data by data and bit by bit according to the historical state and current state of the CEC signal to determine the direction of the CEC signal; and for an AUX signal in DP, performing, by the protocol analysis module, analysis according to the current state of the AUX signal to determine the direction of the AUX signal.

4. The photo-electric conversion module according to claim 1, wherein the frame comprises a frame identifier and frame content, the frame content having different bits at different locations to store control signals of a plurality of protocols.

5. The photo-electric conversion module according to claim 4, wherein a null bit "0" can be inserted into the frame content to maintain distinctiveness and uniqueness of the frame identifier.

6. The photo-electric conversion module according to claim 4, wherein the packing and encoding module performs line coding on the packed data to convert the same to high-speed signals suitable for optical signal transmission, and sends the high-speed signals to the electric-photo conversion module.

7. The photo-electric conversion module according to claim 6, wherein the packing and encoding module introduces 0/1 jump in frame, such that "0" becomes "01" and "1" becomes "10," or "0" becomes "10" and "1" becomes "01," or "0" and "1" become other more complicated 0/1 jump codes.

8. The photo-electric conversion module according to claim 4, wherein the packing and encoding module can transmit null signals.

* * * * *